United States Patent
Turtinen et al.

(10) Patent No.: US 8,280,389 B1
(45) Date of Patent: Oct. 2, 2012

(54) SENSING CONFIGURATION IN CARRIER AGGREGATION SCENARIOS

(75) Inventors: Samuli Turtinen, Ii (FI); Timo Koskela, Oulu (FI); Sami Hakola, Kempele (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/267,571

(22) Filed: Oct. 6, 2011

Related U.S. Application Data

(63) Continuation of application No. 13/084,941, filed on Apr. 12, 2011.

(30) Foreign Application Priority Data

Apr. 12, 2011 (GB) .................................. 1106193.4

(51) Int. Cl.
*H04W 72/00* (2009.01)
(52) U.S. Cl. .................... 455/450; 455/451; 455/452.1; 455/464
(58) Field of Classification Search ............... 455/422.1, 455/450–453, 456.2, 464, 509, 510; 370/395.41, 370/332; 375/E7.141
See application file for complete search history.

(56) References Cited

U.S. PATENT DOCUMENTS

| | | | |
|---|---|---|---|
| 8,036,702 B2 * | 10/2011 | Etemad ....................... | 455/553.1 |
| 2010/0111023 A1 * | 5/2010 | Pelletier et al. ............... | 370/329 |
| 2010/0113004 A1 * | 5/2010 | Cave et al. ................. | 455/422.1 |
| 2010/0118856 A1 * | 5/2010 | Krishnamurthy et al. .... | 370/342 |
| 2010/0157910 A1 * | 6/2010 | Nentwig et al. .............. | 370/329 |
| 2010/0195586 A1 * | 8/2010 | Choi et al. ..................... | 370/329 |
| 2010/0272078 A1 * | 10/2010 | Pani et al. ...................... | 370/336 |
| 2010/0309891 A1 * | 12/2010 | Kuchibhotla et al. ......... | 370/336 |
| 2010/0309930 A1 * | 12/2010 | Harrison et al. .............. | 370/474 |
| 2011/0026475 A1 * | 2/2011 | Lee et al. ....................... | 370/329 |
| 2011/0076962 A1 * | 3/2011 | Chen et al. ..................... | 455/68 |
| 2011/0081932 A1 | 4/2011 | Astely et al. | |
| 2011/0228732 A1 * | 9/2011 | Luo et al. ....................... | 370/329 |
| 2011/0235534 A1 * | 9/2011 | Ratasuk et al. ............... | 370/252 |
| 2011/0243278 A1 * | 10/2011 | Cheng ........................... | 375/340 |
| 2011/0255631 A1 * | 10/2011 | Pi .................................. | 375/295 |
| 2012/0063351 A1 * | 3/2012 | Kim et al. ..................... | 370/252 |
| 2012/0087437 A1 * | 4/2012 | Fong ............................. | 375/295 |
| 2012/0127931 A1 * | 5/2012 | Gaal et al. ..................... | 370/329 |

FOREIGN PATENT DOCUMENTS

| | | |
|---|---|---|
| WO | WO2008/084986 | 7/2008 |
| WO | WO2009/022820 | 2/2009 |

OTHER PUBLICATIONS

Combined Search and Examination Report for corresponding UK application No. 1106193.4, dated Jun. 21, 2011.

* cited by examiner

*Primary Examiner* — Dominic E Rego
(74) *Attorney, Agent, or Firm* — Alston & Bird LLP

(57) ABSTRACT

The present invention proposes methods, devices and computer program products in relation to a communication module configured for communication in a carrier aggregation mode aggregating a primary and at least one secondary carrier. Scheduling information is carried in a control channel of one of the carriers, the scheduling information being associated to a respective one of said aggregated carriers and designating search spaces for payload in a payload channel of said respective aggregated carrier. Sensing is performed responsive to a sensing command added to the scheduling information associated to said at least one secondary carrier, which sensing command commands sensing to be performed on said at least one secondary carrier.

30 Claims, 4 Drawing Sheets

SENSING CONFIGURATION IN CARRIER AGGREGATION SCENARIOS

CROSS REFERENCE TO RELATED APPLICATIONS

This application is a continuation of U.S. Application No. 13/084,941, filed Apr. 12, 2011, which is hereby incorporated herein in its entirety by reference. This application also claims the benefit of United Kingdom application number GB1106193.4, filed on Apr. 12, 2011.

FIELD OF THE INVENTION

The present invention relates to sensing configurations in carrier aggregation scenarios. More specifically, the present invention relates to methods and devices configured to sense downlink component carrier resources on shared bands. For the purpose of the present invention, such component carriers may be frequency division duplex FDD and/or time divisional duplex TDD carriers.

BACKGROUND

Mobile data transmission and data services are constantly making progress. With the increasing penetration of such services, a need for increased bandwidth for conveying the data is emerging. In hitherto known scenarios, networks operated on reserved bands (licensed bands) within the available spectrum, which were reserved for the particular network. As licensed band operation has been increasingly utilized, portions of the radio spectrum that remain available have become limited. Thus, operators, service providers, communication device manufacturers, and communication system manufacturers, are all seeking efficient solutions to utilize unlicensed shared band operation. Communication on an unlicensed shared band is generally based on sharing an available channel between different communication devices. The different communication devices may utilize a common radio access technology RAT. However, in certain scenarios, the different communication devices may utilize different RATs. In an unlicensed shared band, channel access can be distributed, where communication devices can detect a channel, and utilize a channel reservation scheme known to other communication devices in order to reserve a right to access the channel. In distributed channel access, a transmitting communication device and a receiving communication device are generally not synchronized to a global reference.

Currently, a system known as Long Term Evolution LTE is being further developed. When the LTE system concept is further extended in a way that it can be deployed also on unlicensed bands, the devices and local access points have potentially more spectrum available. That spectrum is to be used opportunistically as explained above. This setting can be considered as a kind of non-contiguous carrier aggregation, in which unlicensed spectrum is used as resources or "ground" for secondary carriers/cells for the licensed spectrum primary and secondary carriers/cells, controlled by the network transceiver station (or access node) known as Evolved Node_B, eNB. One step further would be to deploy an eNB totally on some shared band, like in television white space TVWS or in the industrial, scientific and medical, ISM band without any anchor in licensed spectrum (in EUTRAN level) (Evolved Universal Terrestrial Radio Access Network) similar to WLAN deployments to make LTE a competing solution against widely adopted IEEE technologies.

As a future LTE-A system may be deployed on unlicensed bands (e.g. TVWS or ISM bands), for example via carrier aggregation methods as mentioned above, the environment of the spectrum sets further requirements/challenges for the system to operate appropriately. One problem in case downlink carrier aggregation is conducted with one or more component carriers (CC) on unlicensed bands, is to specify certain CC(s) to carry the control/scheduling information (on a control channel such as PDCCH) for a terminal such as a user equipment UE device reliably and without service interruptions due to different interference situation of different CCs at local point of view. Also, in UE point of view, the experienced interference situation may be quite different from eNB side due to interference caused by an unknown system (operating in the same unlicensed band). It could be envisioned also that on unlicensed spectrum deployments with carrier aggregation methods, the cross-carrier scheduling option is to be used to improve interference management and protection of crucial control information transmission among eNBs. Furthermore, there may be some regulatory needs for, e.g., periodic sensing/measurements of the channel on unlicensed/shared band. As an example, for 5 GHz ISM band in Europe, there's tight requirement of sensing radar operations.

Carrier aggregation concept with cross-carrier scheduling method for LTE Rel-10 is currently discussed. In current concepts, the cross-carrier scheduling method is UE specific and component carrier specific and is configured via radio resource control RRC signaling.

In LTE, the channel quality indicator CQI reports are to assist an evolved Node_B, eNB, in selecting an appropriate modulation and coding scheme MCS to use for downlink transmissions. It should be noted that the reported CQI is not a direct indication of signal to interference noise ratio SINR but instead, the UE reports the highest MCS that it can decode with a certain block error rate probability. It is also very questionable whether it is possible to recognize interference coming from other system transmissions with CQI feedback since the bad signal quality may be caused by fading channel.

Furthermore in LTE, the serving eNB may configure and request an individual active UE to perform certain RRM measurement and reporting, specified as a dedicated RRC signaling procedure. Furthermore, in-band dynamic channel quality indication from UE, measured on a physical resource block basis in the DL, and sending sounding signals by UE in the UL are also adopted. On shared bands it is also important to carry out sensing/measurements for unknown interference caused by other system utilizing the same spectrum. In LTE system, protection of, e.g., control information carried by certain CC or by all CCs for themselves is crucial for the system to work reliably.

Thus, there is still a need to further improve such systems in terms of proper interference measurements and reports being enabled.

SUMMARY

Various aspects of examples of the invention are set out in the claims.

According to a first aspect of the present invention, there are provided devices as defined in the appended device claims. Advantageous further developments are as set out in respective dependent claims thereof.

According to a second aspect of the present invention, there are provided methods as defined in the appended method claims. Advantageous further developments are as set out in respective dependent claims thereof.

According to a third aspect of the present invention, there are provided computer program products comprising computer-executable components which, when executed on a computer, are configured to implement the respective methods as set our herein.

The above computer program product/products may be embodied as a computer-readable storage medium.

Thus, improvement is achieved by methods, devices and computer program products enabling sensing/measurements to be conducted on component carriers in communication scenarios adopting a carrier aggregation mode aggregating a primary and at least one secondary carrier. Additional signaling and/or overhead can be avoided while reliable measurements can be carried out and reliable reports can be given.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
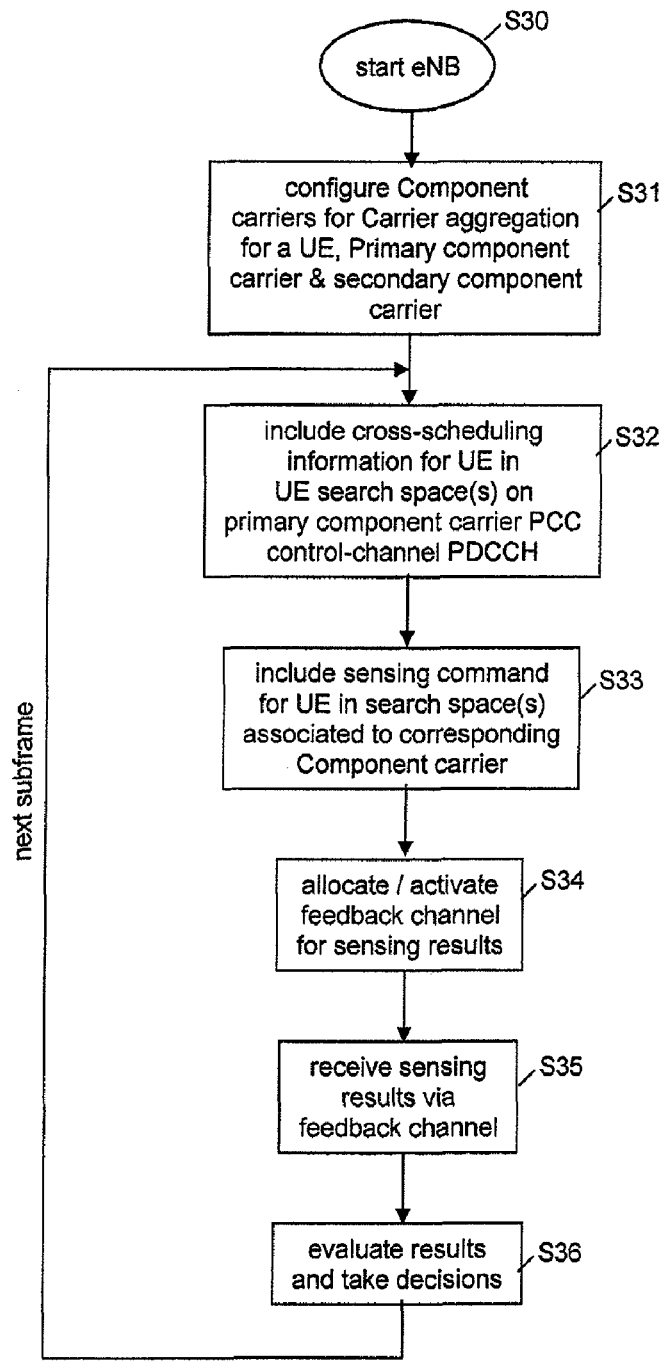
FIG. 1 illustrates exemplary method steps carried out by and implemented at the network transceiver device, eNB, side.

Exemplary aspects of the invention will be described herein below.

It is to be noted that the following exemplary description refers to an environment of the LTE system (long term evolution) in which carrier aggregation is deployed on an (at least partly) unlicensed spectrum. However, it is to be understood that this serves for explanatory purposes only. Other system differing from the LTE system can be adopted as longs as they deploy carrier aggregation. Also, the principles outlined herein below in relation to the present invention can be applied to the unlicensed spectrum, or to a carrier aggregation in a mixture of licensed and unlicensed spectrum.

Generally, carrier aggregation serves to enhance the bandwidth and/or transmission rate and is primarily deployed on downlink carriers in the frequency division duplex system (FDD), but can also be deployed in relation to a phase of a carrier if a TDD system is concerned (time division duplex). In carrier aggregation, individual carriers are "joined" to form the aggregated carrier so as to benefit from the combined bandwidth thereof. In such carrier aggregation, one carrier is a primary component carrier PCC and at least one carrier aggregated with a primary component carrier is referred to as secondary component carrier SCC. Thus, in a communication configured in carrier aggregation mode, a primary and at least one secondary component carrier are present. With particular reference to the subsequent Figures to be described, the component carrier is identified by time and frequency in which it is present. The bandwidth of a carrier is defined by the amount of the difference between its highest and its lowest frequency in which it operates. In time domain, a carrier is composed of a sequence of so-called sub-frames. Within a respective sub-frame, control information as well as payload/data is consecutively transmitted. Thus, a sub-frame is composed of a control channel region followed by a shared channel region. Such control channel and shared channel region is repeated in a subsequent sub-frame. However, different carriers (which are also referred to as component carriers as they constitute a respective component of the carrier aggregation system) may have different bandwidth and also the duration or length of the respective control and/or shared channel regions may vary for different component carriers. Carrier aggregation in connection with the component carriers aggregated are specific for a respective network transceiver device referred to as evolved Node_B, eNB. Terminals UE communicating via the network access the network via the eNB as an access point.

In the following Figures, primary component carriers are denoted by PCC, while secondary component carriers are denoted by SCC followed by an index such as n, k, m, for example. In particular, while at a certain eNB a specific carrier is assigned to serve as a primary component carrier, the same component carrier may be configured as a secondary component carrier at another eNB and/or for another device communicating in carrier aggregation mode. A respective eNB communicates in carrier aggregation mode with one or more terminal devices referred to also as user equipment UE. A user equipment can be a mobile phone, a smart phone or personal computer connectable to a network such as LTE network or other (WCDMA, WIMAX, WLAN or the like) as long as they also make use of carrier aggregation.

Within a control channel portion of a respective sub-frame, control channel elements (CCE) are transmitted. Those control channel elements are also referred to as search spaces. That is, a search space may comprise one or more control channel elements and thus carry the information of those elements. Search space means also that the terminal listening to the downlink control channel searches in this part of the carrier (time, frequency/bandwidth) for information that is intended/dedicated for the terminal. The search spaces are user specific in terms of at least their duration and bandwidth, they may vary from sub-frame to sub-frame and each such search space is associated to a respective one of the component carriers and thus carries information that designates the respective component carrier in terms of information used for cross scheduling. That is, the search spaces include "pointers" for the cross scheduling and denote corresponding "search spaces" where the user equipment can find the payload transmitted to the user equipment or terminal in a payload channel portion of a sub-frame in the corresponding (cross-scheduled) component carrier. Cross-scheduled means that information to be delivered to a specific user equipment is scheduled across carriers so that the total of the information is obtained at the terminal upon combining all the information carried in the aggregated carriers. The payload data is for example conveyed using the physical download shared channel PDSCH as an example of a payload channel, while control data are conveyed e.g. in the physical downlink control channel PDCCH.

In at least an exemplary embodiment, the eNB configures certain UE devices to perform sensing on empty PDCCH field(s) of certain downlink component carrier(s) operating on shared spectrum. This is accomplished in the following way:

The eNB informs certain UE device(s) via messages such as e.g. DCI message or RRC signaling that a sensing is required on certain secondary component carrier(s) cross-scheduled via PCC and/or other SCC(s). The specific information for sensing, e.g., resolution (bandwidth), resources (component carriers) and duration are configured by the network. For the situations, where the PDCCH of component carrier CC in question is used to deliver control information for other UE devices, the network releases some amount of Control Channel Elements (CCEs) for sensing purposes. That is, not all CCEs are sensed but only free CCEs are sensed. For example, in such scenario, the mapping of the empty CCEs follows the CCE allocation of the UE specific search space in corresponding CC (PCC or SCC) where the scheduling information/sensing configuration is carried out. The reasoning is that the sensing UE device then implicitly derives where to carry out sensing and wouldn't require any additional signaling from eNB to UE device. Furthermore, eNB handles the search space allocations for other UE devices in a manner so as not to overlap with the ones in sensing allocation.

To reduce additional signaling and overhead, UE devices explicitly derive the sensing duration by utilizing the dedicated physical control format indicator channel PCFICH information of control channel duration if transmitted on the cross-scheduled component carriers, i.e., the sensing duration would be equal to PDCCH duration. Alternatively, UE uses the PDSCH starting position (as an end for the sensing) which is otherwise signaled via cross-carrier scheduling information.

In at least one embodiment, only UE devices with valid cross-scheduled PDSCH transmission on component carrier to be sensed perform sensing procedure on the quiet (empty) PDCCH field during the corresponding subframe. The reasoning is that these UE devices have valid PUCCH resource grant for corresponding data transmission carried on PDSCH, so that measurement/sensing results can advantageously be reported to the eNB via the PUCCH. The measurement feedback could be indicated in the same PUCCH transmission with CQI-like feedback method which reduces additional signaling and spare uplink resources since otherwise network would need to provide dedicated resources for the feedback.

Optionally certain threshold level could be provided by the network whether the channel was interfered or not for straightforward feedback. That is, a report could be sent only, if interference exceeds such threshold.

In at least a further embodiment, the sensing requirement on PDCCH could also be forced by network to relate also UE devices without incoming PDSCH transmissions. Such sensing could e.g. be triggered by a number of consecutive NACK feedbacks of certain downlink component carrier PDSCH transmission.

Also, before a component carrier CC activation or assignment in carrier aggregation, the proposed sensing method could be configured for self protection purposes at UE device.

If considering a situation, e.g., where sensing on some component carrier is needed but the PDCCH region of that component carrier is completely crowded of control message transmissions (there is not a single empty portion available), the following could be considered as an alternative. According to such alternative, the UE/device is configured to carry out sensing on the allocated PDSCH resources. Such scenario, then encompasses a signaling method to change resource allocation for sensing to a sensing order indicated, e.g., in a one bit flag on corresponding DCI message with scheduling information. That is, in an exemplary configuration (not shown in the Figures), the sensing order flag "SO" set to zero by the eNB indicates to the UE that sensing is to be performed on the PDCCH of the designated component carrier, while the sensing order flag "SO" set to one indicates that sensing is to be performed on the PDSCH of the designated component carrier.

In at least one embodiment, the sensing/measurement results are be utilized in a inter-eNB interference coordination to help decision of Primary Component Carrier and/or Secondary Component Carrier selections, e.g., to deliver PDCCH and cross-carrier scheduling information for UE device.

Now, it is more specifically referred to the drawings and exemplary embodiments illustrated therein.

Basically, in at least an exemplary embodiment, the procedure(s) could be as follows: The eNB configures certain component carriers it operates in for a certain UE device (PCC and SCCs). It configures UE to listen to cross scheduling information of SCC#n from PCC or SCC#k. (hTese cross carrier scheduled component carriers may be configured several for a one UE device). When eNB sends the scheduling information on PCC or SCC#k to UE via PDCCH's DCI message on UE specific search space, it may indicate via one or several bit information (new bits) that UE should perform sensing on PDCCH region of SCC#n before PDSCH transmission takes place in corresponding subframe. In an alternative embodiment eNB configures sensing to be performed on empty PDCCH regions without coming PDSCH transmission to UE device in corresponding subframe. UE sends feedback information of what is sensed/measured. This could be indicated in message of valid PUCCH resource of the PDSCH transmission (new information) The eNB needs to allocate separate feedback resources for the alternative case since there is no valid PUCCH resource grant due to no incoming PDSCH transmission. eNB makes some decisions based on sensing information.

FIG. 1 illustrates exemplary method steps carried out by and implemented at the network transceiver device side, i.e. at the evolved Node_B, eNB. The process starts in a step S30 at the eNB. In a subsequent step S31, the eNB configures component carriers for carrier aggregation for a specific terminal UE in terms of the primary component carrier and at least one secondary component carrier. Since communication in carrier aggregation mode is carried out sub-frame after sub-frame, the subsequent step S32 pertains to an initial sub-frame and the eNB includes cross scheduling information for the user equipment in the user equipment specific search space or search spaces on the primary component carrier, i.e. in its control channel (PDCCH if a LTE system is concerned). Thereafter, in a further step S33, the eNB includes a sensing command for the user equipment in one or more search spaces, wherein each of the search spaces is associated to one corresponding component carrier. Also, the eNB allocates and/or activates a feedback channel for the sensing result to be delivered to the eNB from the respective terminal UE. This is done in step S34. Thereafter, the eNB receives in step S35 sensing results via the feedback channel. Thereafter, the eNB evaluates the results and takes a decision thereon. Afterwards, the process loops back to be repeated in the next sub-frame so that for the next sub-frame, the steps S32 to S36 are repeated. Optionally, not shown in the Figure, the eNB may also collect sensing results for a plurality of sub-frames and only evaluate those results combinedly prior to taking any decision dependent thereon.

As derivable from the above, the eNB comprises a communication module configured for communication in a carrier aggregation mode aggregating a primary and at least one secondary carrier. Further, the eNB comprises a control module that is configured to transmit, S32, scheduling information in a control channel of one of the carriers, i.e. of the primary carrier or a secondary carrier via cross carrier scheduling, the scheduling information being associated to a respective one of said aggregated carriers and designating search spaces for payload in a payload channel in said respective aggregated carrier. In addition, the eNB's control module is configured to add, S33, a sensing command to the scheduling information associated to said at least one secondary carrier, which sensing commands commands sensing to be performed on said at least one secondary carrier.

Figure 2:
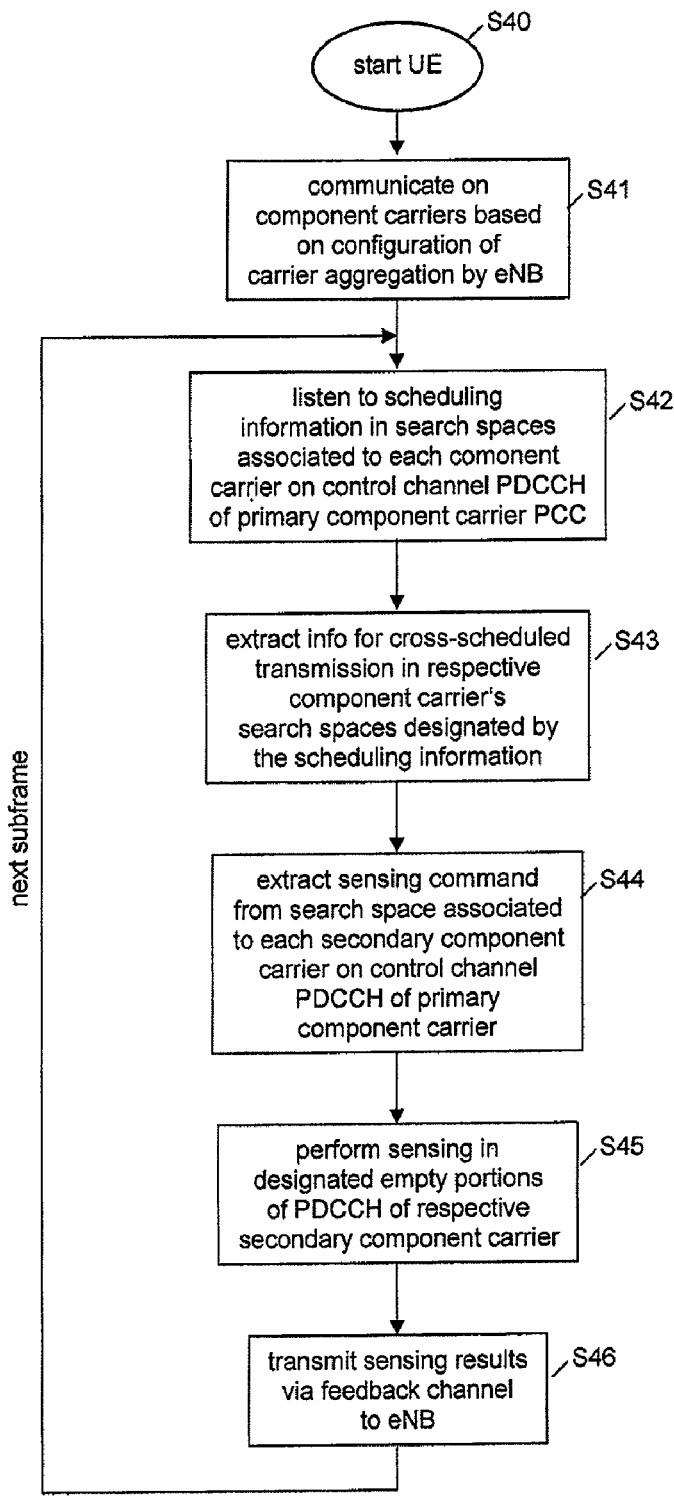
FIG. 2 illustrates exemplary method steps carried out by and implemented at the terminal device, UE, side

FIG. 2 illustrates exemplary method steps carried out by and implemented at the terminal device, UE, side. Likewise, the method starts in a step S40 for the user equipment. In a subsequent step S41, the user equipment exemplarily communicates on component carriers based on the configuration of carrier aggregation as configured by the eNB. Also, as communication is performed sub-frame per sub-frame, in a subsequent step S42 an initial or first sub-frame is concerned and the user equipment listens to scheduling information in the search spaces that are associated to each component carrier on the control channel (PDCCH) of one of the carriers, i.e. the primary component carrier PCC or a secondary component carrier via cross scheduling. Thereafter, in step S43, the user equipment extracts information for the cross-scheduled transmission in respective component carrier's search spaces which are designated by the scheduling information. After this, in step S44, the user equipment extracts the sensing command from the search space associated to each secondary component carrier on the control channel PDCCH of the primary component carrier. Based on this extracted sensing command, the user equipment performs sensing and/or measurement in the designated empty portions of the PDCCH of the respective secondary component carrier in step S45. After having performed the sensing, the user equipment in step S46 transmits the sensing results via the feedback channel to the network transceiver device or evolved Node_B. Thereafter, the flow returns to step S42 so as to be performed for the next sub-frame.

While herein before, the method has been described exemplarily on a functional level with regard to the devices involved in the communication on aggregated carriers, the subsequent description will describe exemplary features of the invention with reference to data conveyed on the respective aggregated carriers.

Figure 3:
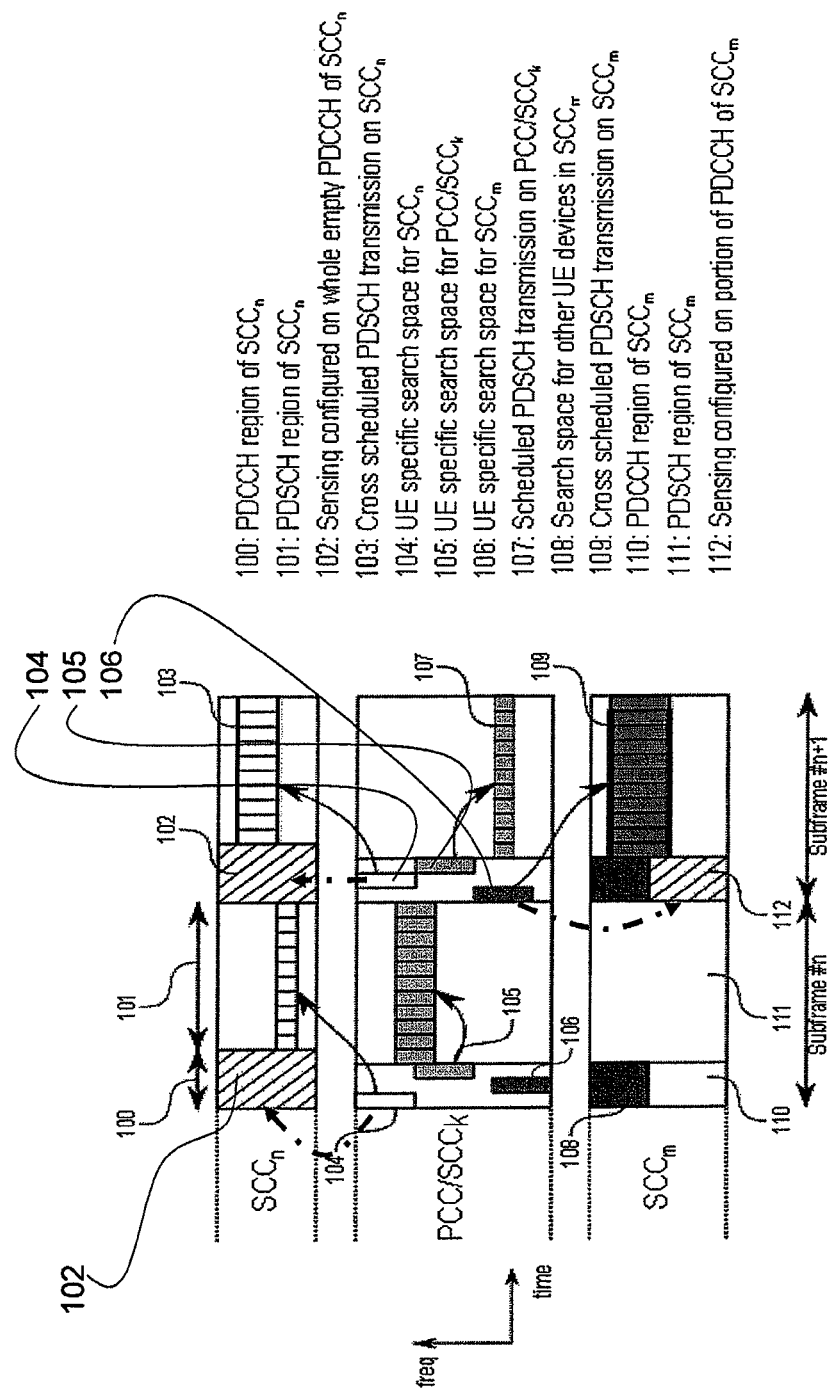
FIG. 3 illustrates an exemplary carrier aggregation scenario with the present invention applied thereto.

FIG. 3 illustrates an exemplary carrier aggregation scenario with the present invention being applied thereto. The depicted scenario relates to a single network transceiver device eNB only. Also, the search spaces indicated and sensing spaces indicated pertain to single user equipment mainly. The carrier aggregation is built by the illustrated three component carriers, a primary component carrier PCC and two secondary component carriers $SCC_m$ and $SCC_n$. The primary component carrier PCC also denoted as $SCC_k$ because the same carrier for another user equipment in the coverage of the network transceiver device eNB may be a secondary component carrier. Each carrier is characterized by its bandwidth. Each component carrier may have a different bandwidth compared to other component carriers. The Figure illustrates two sub-frames for the aggregated carriers, a sub-frame n as well as a subsequent sub-frame n+1. Each sub-frame is constituted by a control channel region followed by a payload channel region. With reference to the exemplary LTE system, the control channel region consists of the PDCCH region while the payload channel region consists of the PDSCH region. Reference numerals 100 and 110, respectively denote the PDCCH region of component carriers $SCC_n$ and $SCC_m$ in sub-frame n, respectively. The PDCCH regions of other component carriers are not individually denoted with reference numerals but are believed to be clearly identifiable in the drawing due to their location in the respective sub-frame. With regard to the user equipment communicating via the eNB, in downlink, the eNB transmits in the PDCCH control channel region of the primary component carrier PCC information for the user equipment concerned. The information is carried in user specific control information search spaces. For example, the eNB transmits control information for the UE in search spaces 104, 105, and 106. Numeral 104 denotes the UE specific search space for $SCC_n$, 106 denotes the UE specific search space for $SCC_m$, and 105 denotes the UE specific search space for $PCC/SCC_k$. With in these search spaces, scheduling information is transmitted and the scheduling information is associated to a respective one of said aggregated carriers and designates search spaces for payload in a payload channel of the respective aggregated carrier. This is indicated by the arrows pointing from search space 104 to the hedged portion in the PDSCH region 101 of the $SCC_n$, and pointing from search space 105 to the hedged grey region of the PDSCH region of the PCC. Likewise, in the subsequent sub-frame n+1 the search spaces 104, 105 and 106 which for this subsequent sub-frame have a different position within the PDCCH region, carry similar information as illustrated by the corresponding arrows from the PDCCH region of the PCC to the PDSCH regions of $SCC_n$, PCC, and $SCC_m$. Thus, in other words, the scheduling information in the PDCCH informs the user equipment on which component carrier to listen for payload dedicated for the user equipment. The scheduling information thus denotes the component carrier as well as a bandwidth of the component carrier to be used. Thus, areas 103, 107 and 109 denote cross-scheduled PDSCH transmissions on the respective primary or secondary component carriers. With the present invention implemented, in the exemplary scenario depicted in the Figure, a sensing command is added to the scheduling information in the search space 104 for sub-frame n and correspondingly for sub-frame n+1. The sensing command commands the user equipment to perform sensing on at least one secondary carrier, that is in the present scenario since the user equipment specific search space 104 contains information designating the search space for payload in the aggregated secondary carrier $SCC_n$, the sensing command added to that scheduling information commands sensing to be performed on the secondary carrier $SCC_n$. This is illustrated by the additional arrow pointing from field 104 to field 102 in the $SCC_n$. That is, field 102 denotes that sensing is configured for the user equipment on the entire empty PDCCH region 100 of the secondary component carrier $SCC_n$. For $SCC_n$, this is valid for both sub-frames, n and n+1. Since the search space 106 is the search space carrying information relating to the secondary component carrier $SCC_m$ and in sub-frame n there is no information "pointing" to search spaces in the PDSCH region, there is no sensing performed in the PDCCH region of $SCC_m$ in sub-frame n. Thus, field 110 is "empty" without sensing being configured for this region. In sub-frame n, however, the PDCCH region of sub-frame n contains a search space 108. 108 however, denotes the search space for another UE device in this secondary component carrier. Although the search space for the other UE device or devices is denoted as a single block, the search space could also be partitioned like the search spaces 104, 105, 106 in the PCC. However, the illustration is serving for explanatory purposes only so that the illustration was intended to be kept simple. In sub-frame n+1 however, the search space 106 contains information pointing to the cross-scheduled transmission on the PDSCH for the user equipment on the secondary component carrier $SCC_m$, as indicated by 109. Therefore, field 106 in sub-frame n+1 also has added a sensing command thereto, which instructs the user equipment to perform sensing on said secondary carrier $SCC_m$, more particularly on the empty portion of the PDCCH of $SCC_m$, denoted by 112.

Figure 4:
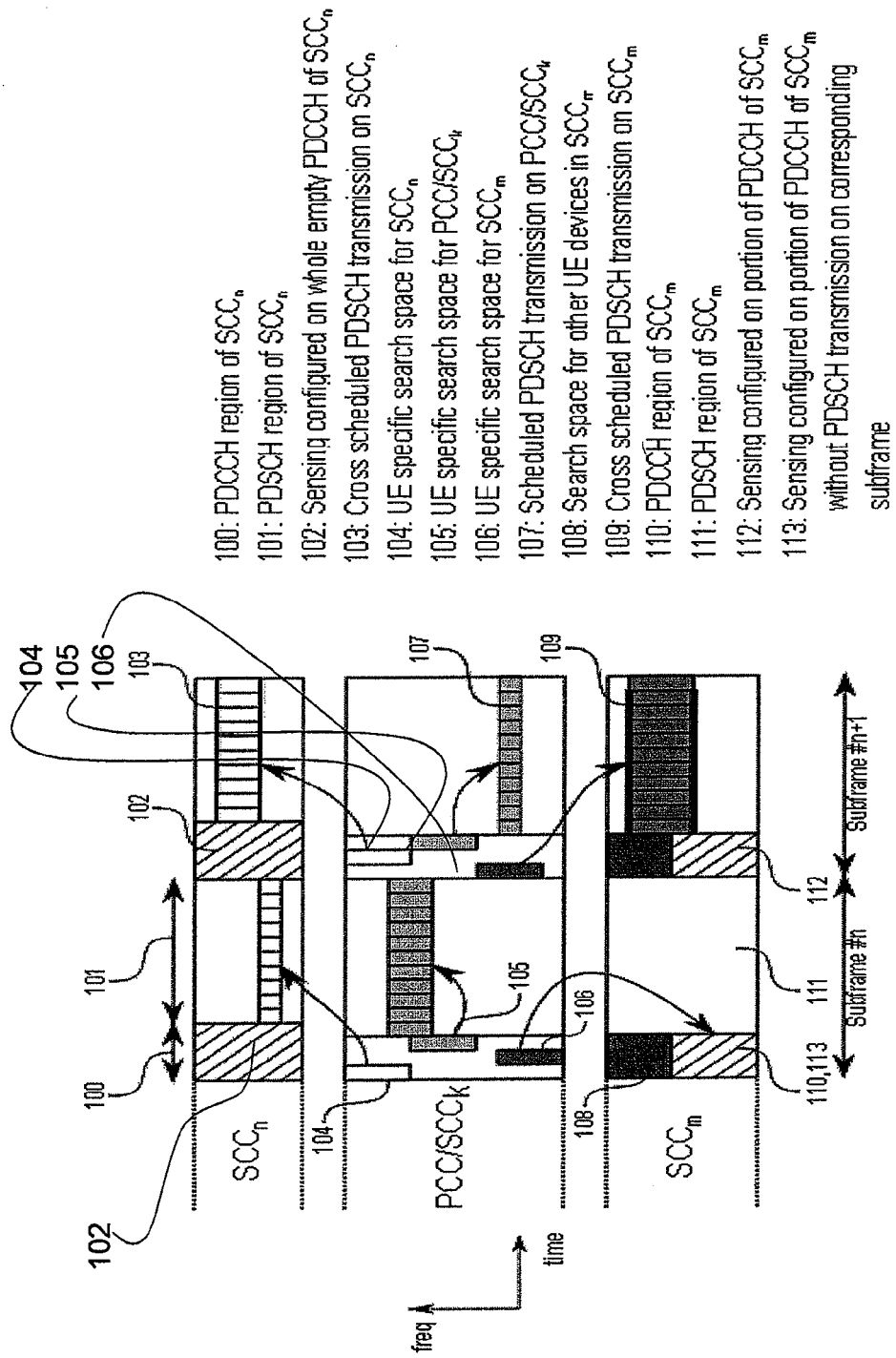
FIG. 4 illustrates another exemplary carrier aggregation scenario with the present invention applied thereto.

FIG. 4 is a similar scenario as FIG. 3 so that a detailed description thereof is not repeated here. However, the only difference between those recites in the fact that in sub-frame n, the search space 106 including information for the secondary component carrier $SCC_m$, although not including information pointing to search spaces in the PDSCH of $SCC_m$ includes a sensing command associated to said secondary carrier $SCC_m$. Thus, the search space 106 contains the sensing command to instruct the user equipment to perform sensing on the configured portion of the PDCCH of $SCC_m$ even without a transmission scheduled to take place on the PDSCH in this sub-frame n on $SCC_m$. This is indicated by the region 113 in FIG. 4 and the arrow pointing from search space 106 to region 110, 113.

Generally, the invention is implemented in an environment such as LTE system adopting carrier aggregation. Exemplary embodiments of the invention are represented by methods and/or correspondingly configured devices such as eNBs and/or UEs. More specifically, the invention generally relates to modem modules of such devices. Other systems can benefit also from the principles presented herein as long as they have identical or similar properties like the carrier aggregation under LTE.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under LTE, WCDMA, WIMAX and WLAN and can advantageously be implemented in user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes methods, devices and computer program products in relation to a communication module configured for communication in a carrier aggregation mode aggregating a primary and at least one secondary carrier. Scheduling information is carried in a control channel of one of the carriers, the scheduling information being associated to a respective one of said aggregated carriers and designating search spaces for payload in a payload channel of said respective aggregated carrier. Sensing is performed responsive to a sensing command added to the scheduling information associated to said at least one secondary carrier, which sensing command commands sensing to be performed on said at least one secondary carrier.

| List of acronyms, abbreviations and definitions | |
|---|---|
| CA | Carrier Aggregation |
| CC | Component Carrier |
| CCE | Control Channel Elements |
| DL | Downlink |
| eNB | Evolved Node B |
| FDD | Frequency Division Duplex |
| ISM | Industrial, Scientific and Medical |
| PDCCH | Physical Downlink Control Channel |
| PDSCH | Physical Downlink Shared Channel |
| RAT | Radio Access Technology |
| TVWS | TV White Space |
| UE | User Equipment |
| UL | Uplink |
| LTE | Long Term Evolution |
| EUTRAN | Evolved Universal Terrestrial Radio Access Network |
| WLAN | Wireless Local Area Network |
| IEEE | Institute of Electrical and Electronics Engineers |
| CQI | Channel Quality Indication |
| RRC | Radio Resource Control |
| RRM | Radio Resource Management |
| MCS | Modulation and Coding Scheme |
| SINR | Signal-to-Interference-and-Noise-Ratio |
| DCI | Downlink Control Information |
| PCC | Primary Component Carrier |
| SCC | Secondary Component Carrier |

What is claimed is:

1. Apparatus for use in controlling an access node, comprising:
    a communication module configured for communication in a carrier aggregation mode aggregating a primary and at least one secondary carrier, and
    a control module, configured to:
        transmit scheduling information in a control channel of one of the carriers, the scheduling information being associated with a respective one of said aggregated carriers and designating search spaces for payload in a payload channel of said respective aggregated carrier; and
        add a sensing command to the scheduling information associated with said at least one secondary carrier, which sensing command commands sensing to be performed on said at least one secondary carrier.

2. Apparatus according to claim 1, wherein said sensing command indicates at least one of the bandwidth in which sensing is to be performed and the duration for which sensing is to be performed on said secondary carrier.

3. Apparatus according to claim 1, wherein said sensing command commands sensing to be performed on at least a portion of the control channel of said secondary carrier.

4. Apparatus according to claim 3, wherein said at least portion of the control channel of the secondary carrier on which sensing is to be performed is an empty portion, which is complementary to those portions of said control channel of the secondary carrier to which scheduling information is allocated.

5. Apparatus according to claim 1, wherein said sensing command is added as an extension of bits to an existing control information field.

6. Apparatus according to claim 1, wherein said sensing command commands sensing to be performed on at least a portion of the shared channel of said secondary carrier, if there is no empty portion available on the control channel of said secondary carrier.

7. Apparatus according to claim 1, wherein said scheduling information is transmitted in a control channel of the primary carrier or in a control channel of a secondary carrier via cross carrier scheduling.

8. Apparatus for use in controlling a user equipment, comprising:
- a communication module configured for communication in a carrier aggregation mode aggregating a primary and at least one secondary carrier, and
- a control module, configured to
   - receive scheduling information in a control channel of one of the carriers, the scheduling information being associated with a respective one of said aggregated carriers and designating search spaces for payload in a payload channel of said respective aggregated carrier; and
   - perform sensing responsive to a sensing command added to the scheduling information associated with said at least one secondary carrier, which sensing command commands sensing to be performed on said at least one secondary carrier.

9. Apparatus according to claim 8, wherein said sensing command indicates at least one of the bandwidth in which sensing is to be performed and the duration for which sensing is to be performed on said secondary carrier.

10. Apparatus according to claim 8, wherein said sensing command commands sensing to be performed on at least a portion of the control channel of said secondary carrier.

11. Apparatus according to claim 10, wherein said at least portion of the control channel of the secondary carrier on which sensing is to be performed is an empty portion, which is complementary to those portions of said control channel of the secondary carrier to which scheduling information is allocated.

12. Apparatus according to claim 8, wherein said sensing command is added as an extension of bits to an existing control information field.

13. Apparatus according to claim 8, wherein said sensing command commands sensing to be performed on at least a portion of the shared channel of said secondary carrier, if there is no empty portion available on the control channel of said secondary carrier.

14. Apparatus according to claim 8, wherein said scheduling information is received in a control channel of the primary carrier or in a control channel of a secondary carrier via cross carrier scheduling.

15. A method for controlling an access node, the method comprising:
- communicating in a carrier aggregation mode aggregating a primary and at least one secondary carrier;
- transmitting scheduling information in a control channel of one of the carriers, the scheduling information being associated with a respective one of said aggregated carriers and designating search spaces for payload in a payload channel of said respective aggregated carrier; and
- adding a sensing command to the scheduling information associated with said at least one secondary carrier, which sensing command commands sensing to be performed on said at least one secondary carrier.

16. A method according to claim 15, wherein said sensing command indicates at least one of the bandwidth in which sensing is to be performed and the duration for which sensing is to be performed on said secondary carrier.

17. A method according to claim 15, wherein said sensing command commands sensing to be performed on at least a portion of the control channel of said secondary carrier.

18. A method according to claim 17, wherein said at least portion of the control channel of the secondary carrier on which sensing is to be performed is an empty portion, which is complementary to those portions of said control channel of the secondary carrier to which scheduling information is allocated.

19. A method according to claim 15, wherein said sensing command is added as an extension of bits to an existing control information field.

20. A method according to claim 15, wherein said sensing command commands sensing to be performed on at least a portion of the shared channel of said secondary carrier, if there is no empty portion available on the control channel of said secondary carrier.

21. A method according to claim 15, wherein said scheduling information is transmitted in a control channel of the primary carrier or in a control channel of a secondary carrier via cross carrier scheduling.

22. A method for controlling a user equipment, the method comprising: communicating in a carrier aggregation mode aggregating a primary and at least one secondary carrier;
- receiving scheduling information in a control channel of one of the carriers, the scheduling information being associated with a respective one of said aggregated carriers and designating search spaces for payload in a payload channel of said respective aggregated carrier; and
- sensing responsive to a sensing command added to the scheduling information associated with said at least one secondary carrier, which sensing command commands sensing to be performed on said at least one secondary carrier.

23. A method according to claim 22, wherein said sensing command indicates at least one of the bandwidth in which sensing is to be performed and the duration for which sensing is to be performed on said secondary carrier.

24. A method according to claim 22, wherein said sensing command commands sensing to be performed on at least a portion of the control channel of said secondary carrier.

25. A method according to claim 24, wherein said at least portion of the control channel of the secondary carrier on which sensing is to be performed is an empty portion, which is complementary to those portions of said control channel of the secondary carrier to which scheduling information is allocated.

26. A method according to claim 22, wherein said sensing command is added as an extension of bits to an existing control information field.

27. A method according to claim 22, wherein said sensing command commands sensing to be performed on at least a portion of the shared channel of said secondary carrier, if there is no empty portion available on the control channel of said secondary carrier.

28. A method according to claim 22, wherein said scheduling information is received in a control channel of the primary carrier or in a control channel of a secondary carrier via cross carrier scheduling.

29. A non-transitory computer readable memory storing a computer program comprising a set of instructions, which, when executed by an access node, cause the access node to:
- communicate in a carrier aggregation mode aggregating a primary and at least one secondary carrier;
- transmit scheduling information in a control channel of one of the carriers, the scheduling information being associated with a respective one of said aggregated carriers and designating search spaces for payload in a payload channel of said respective aggregated carrier; and add a sensing command to the scheduling information associated with said at least one secondary carrier, which sensing command commands sensing to be performed on said at least one secondary carrier.

30. A non-transitory computer readable memory storing a computer program comprising a set of instructions, which, when executed by a user equipment, cause the user equipment to:

communicate in a carrier aggregation mode aggregating a primary and at least one secondary carrier;

receive scheduling information in a control channel of one of the carriers, the scheduling information being associated with a respective one of said aggregated carriers and designating search spaces for payload in a payload channel of said respective aggregated carrier; and sense responsive to a sensing command added to the scheduling information associated with said at least one secondary carrier, which sensing command commands sensing to be performed on said at least one secondary carrier.

\* \* \* \* \*